(12) United States Patent
Kim et al.

(10) Patent No.: US 8,854,596 B2
(45) Date of Patent: Oct. 7, 2014

(54) ACTIVE OPTICAL DEVICE EMPLOYING REFRACTIVE INDEX VARIABLE REGIONS

(75) Inventors: Sun-il Kim, Seoul (KR); Jun-hee Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 216 days.

(21) Appl. No.: 13/231,223

(22) Filed: Sep. 13, 2011

(65) Prior Publication Data

US 2012/0154715 A1 Jun. 21, 2012

(30) Foreign Application Priority Data

Dec. 16, 2010 (KR) ........................ 10-2010-0129311

(51) Int. Cl.
| | | |
|---|---|---|
| *G02F 1/13* | (2006.01) | |
| *G02F 1/29* | (2006.01) | |
| *G02B 3/14* | (2006.01) | |
| *G02F 1/1343* | (2006.01) | |
| *G02F 1/1334* | (2006.01) | |
| *G03H 1/22* | (2006.01) | |

(52) U.S. Cl.
CPC .. *G02B 3/14* (2013.01); *G03H 1/22* (2013.01); *G02F 1/292* (2013.01); *G02F 1/134309* (2013.01); *G02F 2202/36* (2013.01); *G02F 1/13342* (2013.01)
USPC ........... 349/201; 349/156; 359/254; 359/316; 359/573

(58) Field of Classification Search
None
See application file for complete search history.

(56) References Cited

U.S. PATENT DOCUMENTS

| | | | |
|---|---|---|---|
| 6,172,792 B1 * | 1/2001 | Jepsen et al. ................... | 359/254 |
| 2007/0097292 A1 | 5/2007 | Clark et al. | |
| 2010/0208152 A1 * | 8/2010 | Kim et al. ........................ | 349/15 |
| 2011/0088770 A1 * | 4/2011 | Allemand et al. ............ | 136/256 |

FOREIGN PATENT DOCUMENTS

| | | |
|---|---|---|
| JP | 05-281519 A | 10/1993 |
| JP | 2010-107952 A | 5/2010 |
| KR | 10-0653471 A | 10/2004 |

* cited by examiner

*Primary Examiner* — Richard Kim
(74) *Attorney, Agent, or Firm* — Sughrue Mion, PLLC

(57) ABSTRACT

An active optical device includes a substrate; a plurality of refractive index variable regions formed on the substrate; and a voltage applier which applies an electric field to the plurality of refractive index variable regions.

15 Claims, 2 Drawing Sheets

ACTIVE OPTICAL DEVICE EMPLOYING REFRACTIVE INDEX VARIABLE REGIONS

CROSS-REFERENCE TO RELATED APPLICATION

This application claims priority from Korean Patent Application No. 10-2010-0129311, filed on Dec. 16, 2010, in the Korean Intellectual Property Office, the disclosure of which is incorporated herein in its entirety by reference.

BACKGROUND

1. Field

Devices consistent with exemplary embodiments relate to active optical devices employing refractive index variable regions.

2. Description of the Related Art

Optical devices such as a lens, a mirror, and a prism are variously used as a means for changing a path of light in optical systems. In general, an optical device is formed of a material having a fixed refractive index value, and is processed in its form to change a path of light. Accordingly, a very complicated structure is required to control, as desired, a path of light in an optical system.

As a method capable of solving the complicity, active optical devices capable of controlling a refractive index according to an external signal attract attention. A representative active optical device is a polymer-dispersed liquid crystal (PDLC) device. In the PDLC device, a refractive index of liquid crystals varies according to whether an electric field is applied, and thus a difference in refractive index occurs between the liquid crystals and a polymer adjacent to the liquid crystals to cause a difference in optical path. However, a PDLC device has a high driving voltage, which causes a scattering phenomenon due to liquid crystal droplets, and thus has a problem in practical use.

SUMMARY

One or more exemplary embodiments described herein provide active optical devices of which a refractive index is modulated by applying a low driving voltage.

Additional aspects of exemplary embodiments will be set forth in part in the description which follows and, in part, will be apparent from the description, or may be learned by practice of the presented exemplary embodiments.

According to an aspect of an exemplary embodiment, an active optical device includes a substrate; a plurality of refractive index variable regions formed on the substrate; and a voltage applier for forming an electric field in the plurality of refractive index variable regions.

The plurality of refractive index variable regions may include a plurality of internal spaces formed on the substrate; and a liquid crystal material filled in the plurality of internal spaces.

The plurality of internal spaces may be formed by forming on the substrate a polymer pattern layer patterned in a predetermined pattern.

The polymer pattern layer may be formed of a photoresist or a photosensitive polymer.

The polymer pattern layer may be formed of a material having a refractive index within a range of refractive index variance of the liquid crystal material.

The voltage applier may include local electrodes respectively formed in the plurality of refractive index variable regions; and a common electrode layer formed on the polymer pattern layer to cover the entire plurality of refractive index variable regions.

The common electrode layer may be formed of a transparent conductive material.

The local electrodes may be nanostructures having an aspect ratio greater than 1.

The nanostructures may include carbon nanotubes (CNTs), metal nanowires, zinc oxide (ZnO) nanowires, or silicon (Si) nanowires.

The active optical device may further include a conductive thin film formed between the substrate and the polymer pattern layer and electrically connected to the local electrodes.

The active optical device may further include a thin film transistor (TFT) array layer formed between the first substrate and the polymer pattern layer and comprising a plurality of TFTs for individually controlling voltages of the local electrodes respectively formed in the refractive index variable regions.

The active optical device may further include individual electrodes formed in the plurality of refractive index variable regions between the TFT array layer and the local electrodes, and for transmitting output voltages of the plurality of TFTs to the local electrodes.

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION

Figure 1A:
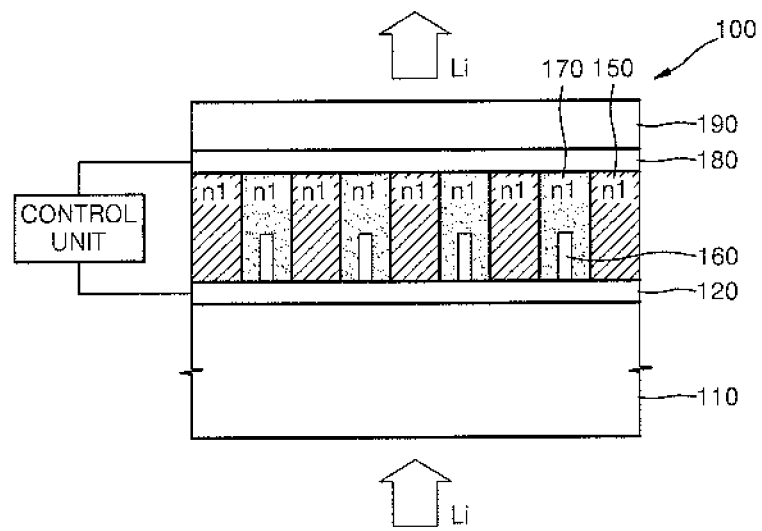
FIGS. 1A and 1B are schematic structural views respectively showing "off" and "on" driving states of an active optical device according to an exemplary embodiment.

Reference will now be made in detail to exemplary embodiments, which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain various aspects of the exemplary embodiments.

Figure 1B:
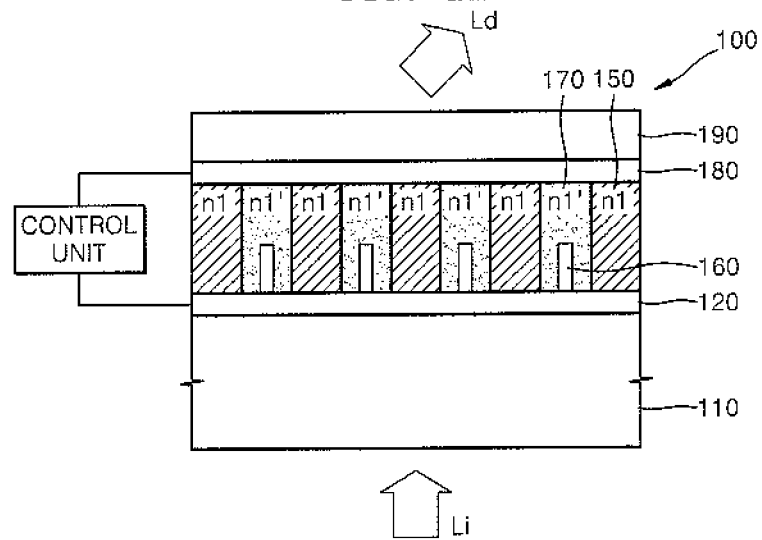

FIGS. 1A and 1B are schematic structural views respectively showing "off" and "on" driving states of an active optical device 100 according to an exemplary embodiment.

The active optical device 100 employs a material having a refractive index that is variable according to an external signal. The active optical device 100 is formed to selectively control a path of incident light by patterning the material. For example, if a material having a refractive index that is variable according to whether an electric field is applied is formed in a predetermined pattern and the refractive index is varied by electrical control, then the active optical device 100 may selectively function as a diffraction device due to a difference in refractive indices between the patterned material and a peripheral material.

In more detail, the active optical device 100 includes a first substrate 110, a plurality of refractive index variable regions 170 formed on the first substrate 110, and a voltage applier for forming an electric field in the refractive index variable regions 170.

The refractive index variable regions 170 may be formed by forming a plurality of internal spaces on the first substrate 110 and filling a liquid crystal material in the internal spaces. As illustrated in FIGS. 1A and 1B, the internal spaces may be formed by forming on the first substrate 110 a polymer pattern layer 150 patterned in a predetermined pattern. The refractive index variable regions 170 filled with the liquid crystal material are packaged by a second substrate 190.

Although same-sized regions are one-dimensionally aligned as the pattern of the polymer pattern layer 150 in FIGS. 1A and 1B, the polymer pattern layer 150 is exemplarily illustrated and a region size, a repetition cycle, and a dimension of the polymer pattern layer 150 may be variously changed.

The voltage applier may include local electrodes 160 formed respectively in the refractive index variable regions 170, and a common electrode layer 180 formed on the polymer pattern layer 150 to cover the entire refractive index variable regions 170. Also, a conductive thin film 120 electrically connected to the local electrodes 160 may be further formed between the first substrate 110 and the polymer pattern layer 150.

The local electrodes 160 have a shape having a high aspect ratio, and may be, for example, nanostructures having an aspect ratio greater than 1. This shape is suggested to obtain a field enhancement effect for forming a large electric field by applying a low voltage. When a voltage applied to the local electrodes 160 having nanostructures is controlled to be "on" or "off," a refractive index of the refractive index variable regions 170 may be switched by applying a lower voltage.

A control unit controls a voltage between the common electrode layer 180 and the local electrodes 160 to control the electric field formed in the refractive index variable regions 170 and, thus, to vary the refractive index of the refractive index variable regions 170.

A structure, materials, and operations of the active optical device 100, according to an exemplary embodiment, will now be described.

The first and second substrates 110 and 190 may be formed of, but is not limited to, a light-transmissive material such as glass or another transparent plastic material.

The polymer pattern layer 150 may be formed of, but is not limited to, a photoresist or a photosensitive polymer. The polymer pattern layer 150 may have one of various patterns for functioning as, for example, a grating or a hologram, and may be formed by using a general photolithographic or interference lithographic method.

The refractive index variable regions 170 may be formed by filling the liquid crystal material in the internal spaces formed by the polymer pattern layer 150. Since liquid crystal molecules are aligned in an electric field along a direction of the electric field, and have generally different major-axis and minor-axis refractive indices, various refractive index distributions may be achieved according to the alignment of the liquid crystal molecules. Also, a material for forming the polymer pattern layer 150 may be selected from among materials having refractive indices within a range of refractive index variance of the liquid crystal material. As such, as will be described later, the active optical device 100 may be controlled to an "off" state in which the refractive index variable regions 170 and the polymer pattern layer 150 have the same refractive index, and an "on" state in which the refractive index variable regions 170 and the polymer pattern layer 150 have different refractive indices.

The common electrode layer 180 or the conductive thin film 120 may be formed of, but is not limited to, a transparent conductive material, e.g., transparent conductive oxide (TCO) such as indium zinc oxide (IZO), aluminum zinc oxide (AZO), or indium zinc oxide (IZO).

Each of the local electrodes 160 may have a shape having a high aspect ratio, for example, a nanostructure having an aspect ratio greater than 1

The local electrodes 160 may be nanostructures having an aspect ratio greater than 1. The nanostructures may be carbon nanotubes (CNTs), or nanowires having a large aspect ratio and formed of a conductor or a semiconductor, e.g., gold (Au) nanowires, zinc oxide (ZnO) nanowires, or silicon (Si) nanowires.

The CNTs are cylindrical crystals formed of carbon atoms and have a nano-sized diameter. The CNTs are divided according to the number of faces for forming the cylindrical crystals into single-walled CNTs and multi-walled CNTs, and are regarded as a next-generation new material due to variable electrical characteristics as a conductor or a semiconductor according to their diameters or shapes. In the current exemplary embodiment, the CNTs are employed to increase the field enhancement effect, i.e., to form a large electric field by applying a low voltage, and multi-walled CNTs having a larger conductivity than single-walled CNTs, may be employed.

The CNTs may be formed by using a generally known method such as an arc-discharge method, a laser deposition method, a thermal chemical vapor deposition (CVD) method, a catalytic CVD method, a plasma enhanced CVD method, or the like.

FIG. 1A shows an optical path when the active optical device 100 is controlled to an "off" state. In this case, the refractive index variable regions 170 and the polymer pattern layer 150 have the same refractive index, e.g., n1, and incident light Li is transmitted through the active optical device 100 without changing a path of the incident light Li.

FIG. 1B shows an optical path when the active optical device 100 is controlled to an "on" state. In this case, the refractive index variable regions 170 are controlled to have a refractive index of n1'. That is, the active optical device 100 has a structure in which the refractive indices n1 and n1' are cyclically alternated, and thus functions as a so-called phase grating. As such, the incident light Li incident on the active optical device 100 is modulated into a diffracted light Ld. An alternating cycle of and sizes of regions having the refractive indices n1 and n1' are determined when the polymer pattern layer 150 is formed, and may be appropriately adjusted in consideration of required diffraction efficiency or the like.

The present inventors have performed a test by forming the polymer pattern layer 150 to have a grating pattern in a depth of about 960 nm and a cycle of 700 nm, and have found a variation in diffraction efficiency by about 7% when a low driving voltage equal to or less than 10V is applied. The above driving voltage is very low in consideration that an existing technology employing polymer-dispersed liquid crystals (PDLCs) requires a high driving voltage equal to or greater than 50V. Also, according to the current exemplary embodiment, since polymer regions and liquid crystal regions are identified from each other by the polymer pattern layer 150 instead of mixing a polymer with liquid crystals, a scattering phenomenon due to liquid crystal droplets does not occur. Also, a diffraction efficiency is further improved by appropriately selecting the material of the polymer pattern layer 150 in consideration of a variance range of refractive indices of the liquid crystal material.

Figure 2:
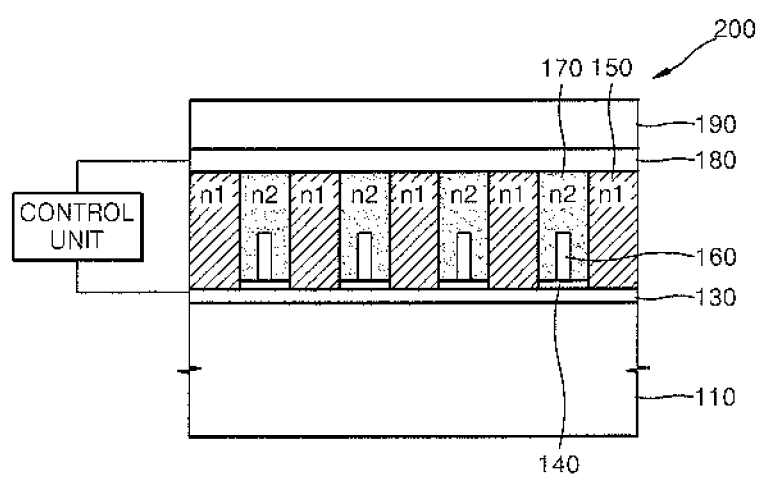
FIG. 2 is a schematic structural view of an active optical device according to another exemplary embodiment.

FIG. 2 is a schematic structural view of an active optical device 200 according to another exemplary embodiment. The current exemplary embodiment is different from the previous exemplary embodiment of FIGS. 1A and 1B in that refractive indices of the refractive index variable regions 170 may be individually controlled. A thin film transistor (TFT) array layer 130 including a plurality of TFTs (not shown) for individually controlling voltages of the local electrodes 160 separately formed in the refractive index variable regions 170 is further formed between the first substrate 110 and the polymer pattern layer 150. The refractive index variable regions 170 may include individual electrodes 140 for transmitting output voltages of the TFTs to the local electrodes 160. However, the individual electrodes 140 are exemplarily illustrated and the output voltages of the TFTs may be directly transmitted to the local electrodes 160.

Since the refractive indices of the refractive index variable regions 170 may be individually controlled when the active optical device 200 is controlled to an "on" state, incident light may be modulated more variously.

As described above, an active optical device according to one or more of the above exemplary embodiments employs a structure in which a refractive index varies by applying a low voltage, and thus characteristics of incident light may be variously modulated according to a material and a pattern of a polymer pattern layer.

Although the active optical device exemplarily modulates a diffraction of light by using a variation in refractive index in the above descriptions, the active optical device may be modified to modulate other characteristics of light, e.g., a wavelength, a path, and a polarization, according to the material and the pattern of the polymer pattern layer, and thus may be applied as various active optical devices. The above exemplary active optical device may be applied to form a hologram for displaying a three-dimensional image, and may be employed in various optical apparatuses that require a function of modulating light, e.g., an optical recording/reproducing system and a display apparatus.

It should be understood that the exemplary embodiments described herein should be considered as examples in a descriptive sense only and not for purposes of limitation. Descriptions of features or aspects within each exemplary embodiment should typically be considered as available for other similar features or aspects in other exemplary embodiments. It will be understood that various changes in form and details may be made to the above-described exemplary embodiments without departing from the spirit and scope of the following claims.

What is claimed is:

1. An active optical device comprising:
   a substrate;
   a plurality of refractive index variable regions formed on the substrate;
   a plurality of refractive index fixed regions formed on the substrate and alternating with the plurality of refractive index variable regions; and
   a voltage applier which applies an electric field to the plurality of refractive index variable regions,
   wherein the voltage applier comprises a plurality of local electrodes, each of the plurality of local electrodes comprising a nanostructure having an aspect ratio greater than 1 and being disposed in a respective one of the plurality of refractive index variable regions.

2. The active optical device of claim 1, wherein the plurality of refractive index variable regions comprise:
   a plurality of internal spaces formed on the substrate; and
   a liquid crystal material filled in the plurality of internal spaces.

3. The active optical device of claim 2, wherein the plurality of internal spaces comprises a polymer pattern layer patterned to have the plurality of refractive index fixed regions.

4. The active optical device of claim 3, wherein the polymer pattern layer comprises at least one of a photoresist or a photosensitive polymer.

5. The active optical device of claim 3, wherein the polymer pattern layer comprises a material having a refractive index within a range of refractive index variance of the liquid crystal material.

6. The active optical device of claim 3, wherein the voltage applier further comprises:
   a common electrode layer formed on the polymer pattern layer to cover all of the plurality of refractive index variable regions.

7. The active optical device of claim 6, wherein the common electrode layer comprises a transparent conductive material.

8. The active optical device of claim 6, further comprising a conductive thin film formed between the substrate and the polymer pattern layer,
   wherein the conductive thin film is electrically connected to the local electrodes.

9. The active optical device of claim 6, further comprising a thin film transistor (TFT) array layer formed between the substrate and the polymer pattern layer,
   wherein the TFT array layer comprises a plurality of TFTs, and
   wherein each one of the plurality of TFTs individually controls a voltage of a respective one of the local electrodes.

10. The active optical device of claim 9, further comprising individual electrodes,
    wherein each one of the individual electrodes is formed in a respective one of the plurality of refractive index variable regions between the TFT array layer and the local electrodes, and
    wherein the individual electrodes transmit output voltages of the plurality of TFTs to the local electrodes.

11. The active optical device of claim 1, wherein the nanostructures comprise at least one of carbon nanotubes (CNTs), metal nanowires, zinc oxide (ZnO) nanowires, or silicon (Si) nanowires.

12. The optical apparatus of claim 1, further comprising a controller configured to control a voltage applied to the voltage applier,
    wherein the controller is configured to selectively control an "off" state in which refractive indices of the plurality of refractive index variable regions are the same as refractive indices of the plurality of refractive index fixed regions, and
    wherein the controller is configured to selectively control an "on" state in which the refractive indices of the plurality of refractive index variable regions are different from the refractive indices of the plurality of refractive index fixed regions.

13. The optical apparatus of claim 1, wherein a driving voltage for the electric field applied to each one of the plurality of refractive index variable regions is less than 50V.

14. The optical apparatus of claim 1, wherein a driving voltage for the electric field applied to each one of the plurality of refractive index variable regions is less than or equal to 10V.

15. The optical apparatus of claim 1, wherein the controller is configured to individually control the electric field applied to each one of the plurality of refractive index variable regions.

* * * * *